United States Patent [19]

Bezos et al.

[11] Patent Number: 5,083,274
[45] Date of Patent: Jan. 21, 1992

[54] RAILROAD BRAKE PRESSURE RECORDING

[75] Inventors: Angel P. Bezos, Rockville, Md.; Emilio A. Fernandez, McLean, Va.

[73] Assignee: Pulse Electronics, Inc., Rockville, Md.

[21] Appl. No.: 486,137

[22] Filed: Feb. 28, 1990

[51] Int. Cl.$^5$ .............................................. B61L 3/00
[52] U.S. Cl. ............................ 364/424.04; 340/452; 246/182 R
[58] Field of Search ............... 364/424.03, 424.04, 364/426.01, 558; 340/438, 451, 452, 626; 246/167 R, 182 R; 369/21

[56] References Cited

U.S. PATENT DOCUMENTS

| | | | |
|---|---|---|---|
| 4,236,215 | 11/1980 | Callahan et al. | 364/424.04 |
| 4,553,723 | 11/1985 | Nichols et al. | 364/426.01 |
| 4,582,280 | 4/1986 | Nichols et al. | 246/182 R |
| 4,755,803 | 7/1988 | Shockley et al. | 340/452 |
| 4,906,970 | 3/1990 | Momura | 340/438 |

Primary Examiner—Gary Chin
Attorney, Agent, or Firm—Whitham & Marhoefer

[57] ABSTRACT

A railroad brake pressure recorder for use with both analogue and digital break pressure manifolds monitors the signal on its analogue air brake pressure input connector. If the signal on this input exceeds a predetermined frequency, inputs are processed as coming from an analogue manifold. If it is less than this frequency, the inputs are processed as coming from a digital manifold.

3 Claims, 2 Drawing Sheets

RAILROAD BRAKE PRESSURE RECORDING

BACKGROUND OF THE INVENTION

1. Field of the Invention

The present invention generally relates to the field of railroad brake pressure recording, and more particularly to a recorder which is plug compatible with both analogue and digital air brake pressure manifolds.

2. Description of the Prior Art

In the railroad industry, an air brake pressure manifold is used to report air brake pressure to the train operator. Historically, this pressure has been reported in terms of discrete, incremental reductions from the maximum pressure to which the train's brake system had been charged. A three digit binary code is used to designate seven discrete pressure reduction levels plus an emergency condition. A three conductor bus carries the binary coded pressure information to an operator display, which may be part of the manifold, and to three output pins to which a recorder external to the manifold can be connected.

Recently, so called analogue brake pressure manifolds have been proposed that measure and report the absolute air brake pressure over a continuous range. These manifolds employ a pressure to frequency convertor which, for example, may be calibrated so as to provide an output signal from zero to 100 Hz over a brake pressure range from zero to the maximum pressure to which the system will be charged.

SUMMARY OF THE INVENTION

It is an object of this invention to provide a protocol for communication between an air brake manifold and a recorder which allows the recorder to distinguish between inputs from an analogue manifold and inputs from a digital manifold; a protocol which allows the recorder to be pin compatible with presently installed digital manifolds; and a protocol which at the same time allows the recorder to make maximum use of all its input channels and all the available connector pins.

A related object of this invention is the provision of a recorder which is responsive to the communication protocol; a recorder which is pin compatible with presently installed digital manifolds; a recorder which does not sacrifice any connector pins or recorder channels.

Briefly, this invention contemplates the provision of a protocol in which the variable frequency output signal of an analogue air manifold is connected to a predetermined pin position. In accordance with the protocol, an analogue manifold transmits a minimum frequency signal at this pin position to identify itself as an analogue manifold. The recorder looks for the presence or absence of this minimum frequency signal and couples information from the binary bus pin positions to the recording medium if a frequency signal is absent and couples information from the analogue pin position to the medium if the frequency signal is present. In addition, if the minimum frequency signal is present, the recorder can use the pins and channels previously assigned to be used for the manifold bus for any other purpose, such as inputs for recording on-off events.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT OF THE INVENTION

Figure 1:
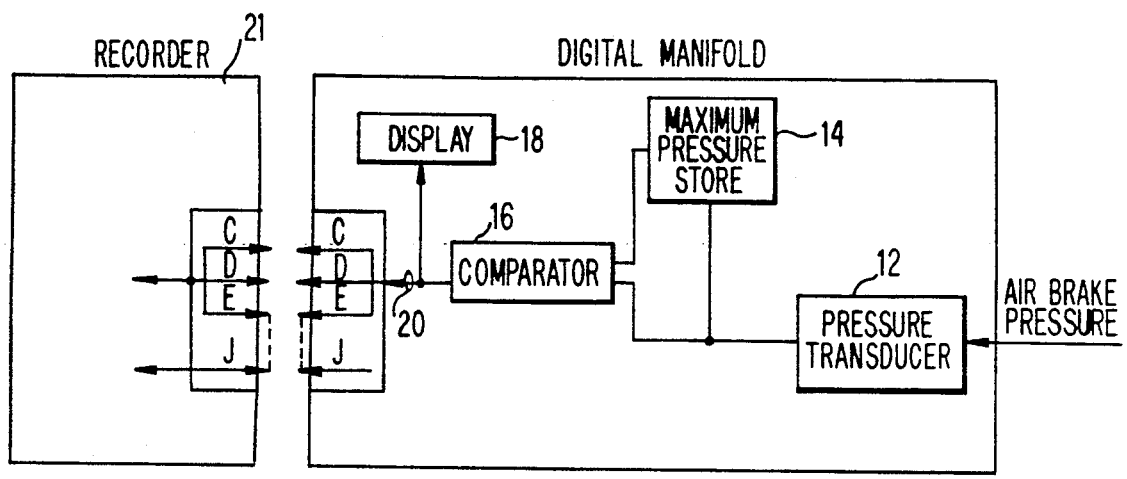
FIG. 1 is a schematic block diagram of a digital air brake pressure manifold.

Referring now to the drawings, in which the same reference numeral indicates the same element in the various figures, FIG. 1 shows a block diagram of a digital air brake manifold of the type commonly installed in railway locomotives at the present time. It comprises: a pressure to digital transducer 12; a digital storage 14 that stores the maximum pressure to which the brake system is charged; a comparator 16 that compares the output of the transducer 12 to the stored maximum pressure; a brake pressure reduction display 18; and a three conductor bus 20 for coupling the binary brake pressure reduction status to a three element output designated in the drawing as pin connectors C, D, and E. It should be noted that the respective mating members which establish electrical connection between the manifold and the recorder are referred to herein as pins and pin connectors as is customary in the art. However, it will be appreciated that the invention is not limited to any particular type of apparatus for making an electrical connection between mating parts. As will be appreciated by those skilled in the art, the connectors are adapted to be connected to a recorder 21, such as the Pulse model TTX-REC-06H recorder. As will also be appreciated by those skilled in the art, the output connector of a digital air brake manifold includes an additional output pin at a predetermined position, pin J illustrated in the drawing, that is not for recording digital air brake pressure reductions.

Figure 2:
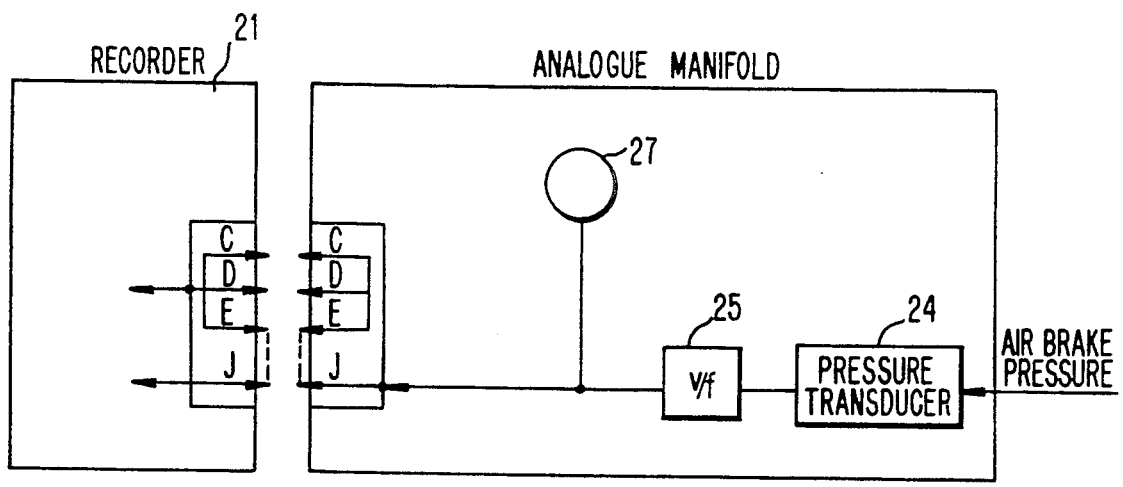
FIG. 2 is a schematic block diagram of an analogue air brake pressure manifold.

Referring now to FIG. 2, an analogue manifold has a pressure to transducer 24, which may be of a suitable commercially available design. It will be appreciated by those skilled in the art, the pressure to frequency conversion may be accomplished with two discrete commercially available components; a pressure-to-voltage convertor 24 (e.g. 0-5 volts) and a voltage-to-frequency convertor 25. The output of the voltage-to-frequency convertor 25 is coupled to output position J. The output frequency varies as the brake pressure input varies. Typically, an analogue manifold may be calibrated to have an output signal frequency which ranges from zero Hz to 100 Hz over input brake air pressure range, say from zero to 100 psi. If desired, the analogue manifold may include a suitable display such as an LED 27 blinking on and off at a rate proportional to the frequency to indicate proper operation of the unit.

In accordance with this invention, a protocol is established whereby the analogue manifold maintains a minimum low frequency signal at pin position J even in the absence of an input pressure to the manifold. This is accomplished in accordance with the preferred embodiment of the invention by adjusting the calibration so that, for example, the output signal varies from 15 Hz to 115 Hz as the input pressure varies from zero to maximum pressure.

Figure 3:
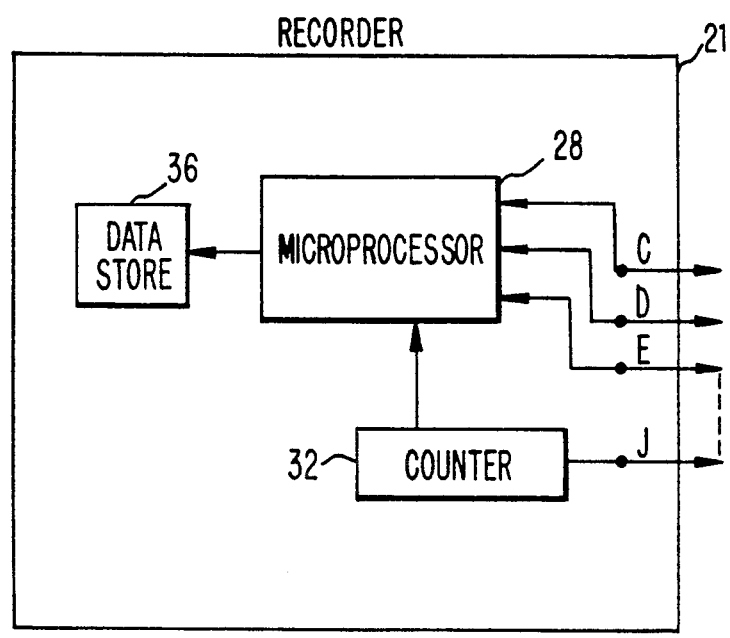
FIG. 3 is a block diagram of a recorder which is plug compatible with both digital and analogue air brake manifolds observing the protocol of this invention.

Referring now to FIG. 3, a recorder in accordance with this invention has input connectors C, D, E and J positioned to mate respectively with connector positions C, D, E and J of both analogue and digital air manifolds. The recorder of this invention determines the type of manifold to which it is connected by the signal at input J, the input signal line for an analogue manifold. It will be appreciated that in having input J serve this dual function, the requirement for an extra input pin position to indicate the type of manifold is eliminated.

In the preferred embodiment of the recorder, a microprocessor 28 formats both digital manifold inputs from inputs C, D and E and analogue inputs from J. The formatted output of microprocessor 28 is transferred to a suitable data storage device 36, such as a removable solid state memory, for example.

Pin J is coupled to the input of a counter 32 whose output is coupled to microprocessor 28. The counter accumulates a count over a predetermined fixed interval (e.g. 1 second). The count is a function of the frequency of the signal coupled to connector J. The accumulated count is transferred to the microprocessor 28 at the end of the predetermined fixed interval (e.g., 1 second). The microprocessor retains these counts in memory. If the total count of a predetermined number of these intervals (e.g., 60 intervals) is more than a predetermined number, the microprocessor 28 is programmed to recognize inputs from connectors C, D, E and J as data from an analogue manifold. Counts for successive intervals are processed by the microprocessor and stored as a record of brake pressure. As explained previously, the protocol requires that an analogue manifold maintain a minimum frequency signal at ZERO input. The microprocessor also will process inputs, if any, from connectors C, D, and E as inputs from an analogue manifold, e.g., on-off inputs, or any other input- these pins are not necessary in the analogue manifold for transferring brake pressure information to the recorder. Similarly, if the total count accumulated by the microprocessor is less than the predetermined number, the microprocessor is programmed to process inputs from connectors C, D and E as digital manifold inputs and store data from these inputs as a record of brake pressure data.

Example of criteria that could be used:
More than 150 transitions in 60 seconds = analogue
Less than 150 transitions in 60 seconds = digital Criteria to be met for at least two consecutive 60 second periods before a change of state is recognized. Note: This last requirement is added to make the system more noise immune.

What has been described in the preferred embodiment in terms of frequencies could also be implemented in terms of voltage or current.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A recorder having a data storage unit for storing data from analogue and digital railroad air brake manifolds, comprising:
   a connector for connecting said recorder to analogue and digital railroad air brake manifolds, said connector having a plurality of electrical input contacts, three of said input contacts positioned to mate with air brake pressure data output contacts of a digital air brake manifold and one of said input contacts positioned to mate with an air brake pressure data output contact of an analogue air brake manifold;
   signal frequency responsive means connected to said one input contact positioned to mate with said analogue manifold brake pressure output contact, said signal frequency responsive means producing a first characteristic output in response to a signal above a predetermined minimum frequency and a second characteristic output in response to a signal below said minimum frequency;
   means responsive to said first characteristic output to process input data from said one input contact as air brake pressure data, and responsive to said second characteristic output to process input data from said three input contacts as said air brake pressure data.

2. A recorder as in claim 1, wherein said signal frequency responsive means includes a counter whose output is coupled to an input of a microprocessor and said first characteristic signal is an cumulation of a minimum count within a predetermined interval and said second characteristic signal is the accumulation of less than said minimum count within said predetermined interval.

3. A recorder having a data storage unit for storing data from analogue and digital railroad air brake manifolds, comprising:
   a connector for connecting said recorder to analogue and digital railroad air brake manifolds, said connector having a plurality of electrical input contacts, three of said input contacts positioned to mate with air brake pressure data output contacts of a digital air brake manifold and one of said input contacts positioned to mate with an air brake pressure data output contact of an analogue air brake manifold;
   signal responsive means connected to said one input contact positioned to mate with said analogue manifold brake pressure output contact, said signal responsive means producing a first characteristic output in response to a signal above a predetermined minimum and a second characteristic output in response to a signal below said minimum;
   means responsive to said first characteristic output to process input data from said one input contact as air brake pressure data, and responsive to said second characteristic output to process input data from said three input contacts as said air brake pressure data.

* * * * *